(12) United States Patent
Li et al.

(10) Patent No.: US 8,503,545 B2
(45) Date of Patent: Aug. 6, 2013

(54) I/Q IMBALANCE COMPENSATION

(75) Inventors: Yan Li, Newtown, PA (US); Azzedine Touzni, West Dundee, IL (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 863 days.

(21) Appl. No.: 11/895,985

(22) Filed: Aug. 27, 2007

(65) Prior Publication Data

US 2008/0056397 A1    Mar. 6, 2008

Related U.S. Application Data

(60) Provisional application No. 60/824,110, filed on Aug. 31, 2006.

(51) Int. Cl.
*H04K 1/10*    (2006.01)

(52) U.S. Cl.
USPC ........... 375/260; 375/332; 375/346; 375/319; 375/232; 375/227; 455/126; 455/313

(58) Field of Classification Search
USPC ................. 375/260, 332, 346, 319, 296, 302, 375/227, 232; 455/126, 313
See application file for complete search history.

(56) References Cited

U.S. PATENT DOCUMENTS

| | | | |
|---|---|---|---|
| 6,714,772 B2 | 3/2004 | Kasahara et al. | |
| 7,602,861 B2 * | 10/2009 | Wong et al. | 375/319 |
| 2004/0082300 A1 * | 4/2004 | Scheck | 455/126 |
| 2005/0147190 A1 | 7/2005 | Nishikawa | |
| 2005/0182806 A1 * | 8/2005 | Krishnamoorthi et al. | 708/404 |
| 2006/0126754 A1 * | 6/2006 | Filimonov et al. | 375/296 |
| 2006/0133548 A1 * | 6/2006 | Oh et al. | 375/346 |
| 2006/0214902 A1 * | 9/2006 | Tamura | 345/100 |
| 2006/0291549 A1 * | 12/2006 | Seppinen et al. | 375/227 |
| 2007/0058755 A1 * | 3/2007 | Husted | 375/332 |

FOREIGN PATENT DOCUMENTS

| | | |
|---|---|---|
| JP | 2005197968 A2 | 7/2005 |
| JP | 2005527152 T2 | 9/2005 |
| JP | 2008509577 T2 | 3/2008 |
| JP | 2009188938 A2 | 8/2009 |

(Continued)

OTHER PUBLICATIONS

ETSI, "Digital Video Broadcasting (DVB); Transmission System for Handheld Terminals (DVB-H)", ETSI EN 302 304 V1.1.1 (Nov. 2004).

(Continued)

*Primary Examiner* — Eva Puente
(74) *Attorney, Agent, or Firm* — Volpe and Koenig, P.C.

(57) ABSTRACT

A ZIF direct-conversion OFDM receiver capable of estimating and correcting an I/Q imbalance in a baseband signal. A complex down-conversion is performed on a received signal r(t). The received signal r(t) is divided into an In-phase signal (I) and Quadrature-phase signal (Q). An I/Q imbalance is introduced by the local oscillator such that the I/Q imbalance includes an amplitude imbalance factor ($\rho$) and phase imbalance factor ($\phi$). The I and Q signals are amplified, filtered and digitized. The digitized I and Q signals are processed via a Fast Fourier Transform (FFT). An I/Q compensation algorithm estimates the values of the amplitude imbalance factor ($\rho$) and, the phase imbalance factor ($\phi$) based on a time expectation calculation. The imbalance factors are applied to the baseband signal to recover the signal of interest x(t). The OFDM receiver outputs the signal of interest x(t) to an information display device.

17 Claims, 4 Drawing Sheets

FOREIGN PATENT DOCUMENTS

| | | |
|---|---|---|
| WO | 03094463 A1 | 4/2003 |
| WO | 03/094463 | 11/2003 |
| WO | 2006030481 A1 | 3/2006 |

OTHER PUBLICATIONS

IEEE Computer Society and the IEEE Microwave Theory and Techniques Society, "IEEE Standard for Local and Metropolitan Area Networks, Part 16: Air Interface for Fixed Broadband Wireless Access Systems", IEEE Std 802.16-2004, (Oct. 1, 2004).

IEEE Computer Society, "IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 4: Further Higher Data Rate Extension in the 2.4 GHz Band", IEEE Std 802.11g-2003, (Jun. 27, 2003).

Schuchert et al., "A Novel IQ Imbalance Compensation Scheme for the Reception of OFDM Signals", IEEE Transactions on Consumer Electronics, vol. 47, No. 3, pp. 313-318, (Aug. 2001).

Shafiee et al., "Calibration of IQ Imbalance in OFDM Transceivers", ICC '03. IEEE International Conference on Communications, 2003, vol. 3, pp. 2081-2085, (May 11-15, 2003).

Tarighat et al., "Compensation Schemes and Performance Analysis of IQ Imbalances in OFDM Receivers", IEEE Transactions on Signal Processing, vol. 53, No. 8, pp. 3257-3268, (Aug. 2005).

Tubbax et al., "Compensation of IQ Imbalance in OFDM Systems". 2003 ICC '03 IEEE International Conference on Communications, vol. 5, pp. 3403-3407, (May 11-15, 2003).

Valkama et al., "Advanced Methods for I/Q Imbalance Compensation in Communication Receivers", IEEE Transactions on Signal Processing, vol. 49, No. 10, pp. 2335-2344, (Oct. 2001).

Windisch et al., "Standard-Independent I/Q Imbalance Compensation in OFDM Direct-Conversion Receivers". In Proceedings of the 9th International OFDM-Workshop, (In-OWo'04), pp. 57-61, (Dresden, Germany, Sep. 2004).

Xing et al., "Frequency Offset and I/Q Imbalance Compensation for OFDM Direct-Conversion Receivers", 2003 IEEE International Conference on Acoustics, Speech, and Signal Processing, 2003. Proceedings. (ICASSP apos;03), vol. 4, pp. IV-708-711, (Apr. 6-10, 2003).

Yu et al., "A novel technique for I/Q imbalance and CFO compensation in OFDM systems," Circuits and Systems, 2005. ISCAS 2005, IEEE International Symposium on May 23, 2005.

Yan et al., "Carrier frequency offset estimation for OFDM systems with I/Q imbalance," Circuits and Systems, 2004. MWSCAS 2004. The 2004 47th Midwest Symposium on Jul. 25, 2004.

* cited by examiner

I/Q IMBALANCE COMPENSATION

CROSS-REFERENCE TO RELATED APPLICATIONS

This application claims the benefit of U.S. Provisional Application No. 60/824,110, filed Aug. 31, 2006.

BACKGROUND

Orthogonal Frequency Division Multiplexing (OFDM) is the basis for several wireless standards such as IEEE 802.11a, IEEE 802.11g, IEEE P802.15.3, IEEE 802.20 and IEEE 802.16. These standards are utilized in many portable and handheld computer devices such as laptop PC, Personal Digital Assistances, multimedia viewers (e.g., for use with DVB, and DVB-H networks) and cellular telephones. A traditional heterodyne receiver can be utilized to receive OFDM based signals. However, the integration of a traditional receiver onto a single integrated circuit is complex and expensive. Additionally, a single chip heterodyne system typically uses higher levels of electrical power to operate. In the portable device market, the efficiency and duration of the power supply system is an important aspect of device performance. Thus, a heterodyne system on a chip is not a preferable solution for portable devices.

An alternative to a traditional heterodyne receiver is the Zero Intermediate Frequency (ZIF) direct-conversion receiver. A ZIF direct-conversion receiver is generally easier to manufacture as a single integrated circuit, and therefore provides improved power consumption performance as compared to a traditional heterodyne receiver. A design issue associated with the ZIF direct-conversion receiver is the potential signal degradation due to an imbalance between the In-phase (I) and Quadrature-phase (Q) branches in the baseband signal. In general, an I/Q imbalance is caused by a mismatching of analog components within the receiver (e.g., doping concentration and oxide thickness in CMOS circuits). The imbalance is likely to increase with higher silicon integration, as well as higher carrier frequencies.

Some useful I/Q imbalance compensation algorithms are available. These algorithms, however, generally require complex circuit elements to handle functions such as special training performance of the receiver.

SUMMARY

In accordance with implementations of the invention, one or more of the following capabilities may be provided. OFDM signals are obtained with improved Bit Error Rate (BER) performance. I/Q imbalance parameters can be computed with reduced processing overhead. The complexity of receiver circuit design can be reduced. Receiver power consumption and footprint can be reduced.

In general, in an aspect, the invention provides an Orthogonal Frequency Division Multiplexing (OFDM) digital signal processing system, the OFDM signal including a baseband signal comprising a signal of interest, an In-phase (I) branch and a Quadrature-phase (Q) branch, the system including a processing module configured to output the signal of interest by performing Fourier transforms on the digitized I branch and Q branch signals, calculating a time expectation of the digitized baseband signal in the frequency domain, and applying the results of the time expectation calculation to the baseband signal to determine the signal of interest.

Implementations of the invention may include one or more of the following features. A tuner module configured to receive the OFDM signal and output the baseband signal including the signal of interest, the I branch and the Q branch. An analog to digital converter module coupled to the tuner module and configured to receive the I branch and Q branch signals, and output digitized I branch and Q branch signals.

In general, in another aspect, the invention provides a zero intermediate frequency (ZIF) receiver for receiving an orthogonal frequency division multiplexed (OFDM) digital signal, the OFDM signal including a signal of interest and being transmitted toward the receiver via a transmission channel, the receiver including a tuner module configured to receive the OFDM signal and output a baseband signal, wherein the baseband signal includes the signal of interest, an In-phase (I) branch, and Quadratrature-phase (Q) branch signals, an analog to digital converter module coupled to the tuner module and configured to receive the analog I branch and Q branch signals, and output digitized I branch and Q branch signals, a baseband processing module coupled to the analog to digital converter module and configured to output the signal of interest by performing Fourier transforms on the digitized I branch and Q branch signals, calculating a time expectation of the digitized baseband signal in the frequency domain, and applying the results of the time expectation calculation to the baseband signal to determine the signal of interest.

Implementations of the invention may include one or more of the following features. The tuner module may include a band-pass filter, a low noise amplifier, an AGC amplifier, and a local oscillator configured to provide a complex waveform. The baseband processor may include one or more memory units, and one or more processors. The baseband processor is configured to electronically compute the time expectation by estimating an amplitude imbalance factor $\tilde{\rho}$ and a phase imbalance factor $\phi$.

In general, in another aspect, the invention provides a computerized method for outputting a signal of interest from a received OFDM signal including receiving a signal in an OFDM format, converting the received OFDM signal via ZIF direct-conversion to respective In-phase (I) and Quadrature-phase (Q) signals, determining an estimated signal of interest, transforming the I and Q signals via a FFT, processing the I and Q signals in the frequency domain with an I/Q imbalance algorithm to determine a plurality of I/Q imbalance parameters, calculating the signal of interest as a function of the estimated signal of interest and at least one of the plurality of I/Q imbalance parameters, and outputting the signal of interest.

In general, in another aspect, the invention provides a computer-readable medium having computer-executable instructions for performing a method including receiving an In-phase (I) and Quadrature-phase (Q) signals from a Zero Intermediate Frequency (ZIF) direct conversion OFDM receiver, electronically transforming the I and Q signals via a FFT, estimating an amplitude imbalance factor and a phase imbalance factor, and outputting a signal of interest responsive to the amplitude and phase imbalance factors.

In general, in another aspect, the invention provides a computer readable medium having program instructions for the development and testing of an integrated circuit including program instructions for identifying an OFDM signal, the OFDM signal including an In-phase (I) and Quadrature-phase (Q) signals, program instruction for transforming the I and Q signals via a FFT, program instructions for estimating an amplitude imbalance factor and a phase imbalance factor, and program instructions for outputting a signal of interest responsive to the amplitude and phase imbalance factors. The program instructions can be written in a hardware description language (HDL), and the hardware description language can be verilog.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide techniques for estimating and correcting an I/Q imbalance in a ZIF direct-conversion OFDM receiver such as in a cellular telephone. A radio frequency (RF) signal comprising a carrier frequency ($f_0$) and a signal of interest $x(t)$ is received by an antenna. The RF signal is passed through a band-pass filter (BPF) and amplified by a low noise amplifier (LNA) to produce a received signal $r(t)$. A complex down-conversion is performed on the received signal $r(t)$. The complex down-conversion uses a complex signal oscillator, including an In-phase and a Quadrature-phase signal. The received signal $r(t)$ is divided into an In-phase signal (I) and Quadrature-phase signal (Q). Generally, an I/Q imbalance is introduced by the local oscillator. The I/Q imbalance includes an amplitude imbalance factor ($\rho$) and phase imbalance factor ($\phi$), wherein if $\rho=1$ and $\phi=0$ then the I and Q branches are perfectly matched (i.e. there is no I/Q imbalance). The I and Q signals are amplified, filtered and digitized. The digitized I and Q signals are processed via a Fast Fourier Transform (FFT). An I/Q compensation algorithm estimates the values of the amplitude imbalance factor ($\rho$) and, the phase imbalance factor ($\phi$) to recover the signal of interest $x(t)$. The OFDM receiver outputs the signal of interest $x(t)$ to an information display device. This ODFM receiver is exemplary, however, and not limiting of the invention as other implementations in accordance with the disclosure are possible.

Figure 1:
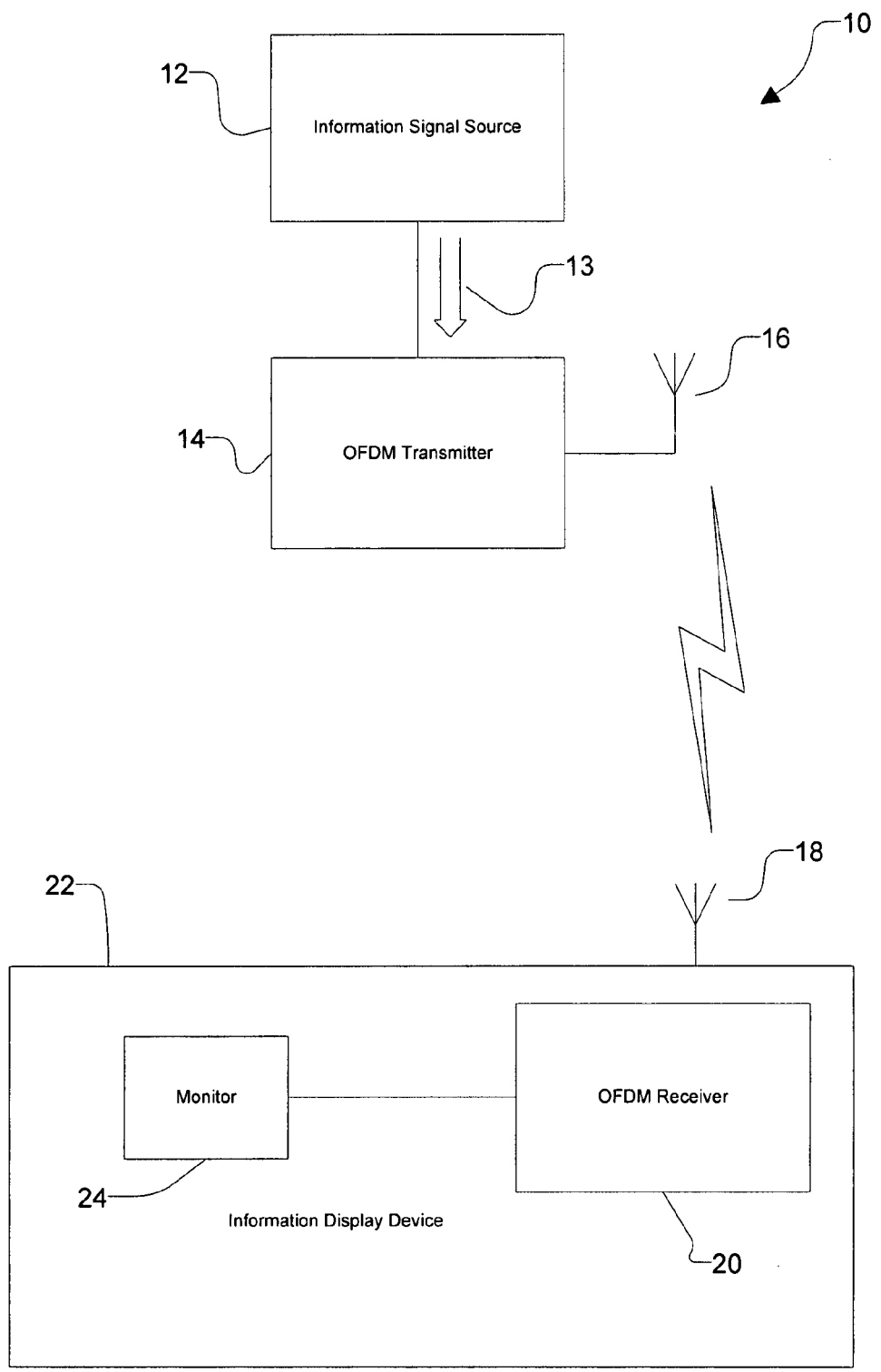
FIG. 1 is a simplified block diagram of an OFDM communication system.

Referring to FIG. 1, an OFDM communication system 10 for transferring electronic information from one point to another can include an information signal source 12, an OFDM transmitter 14, a transmission antenna 16, a receiving antenna 18, an OFDM receiver 20, and an information display device 22. The system 10 can include appropriate hardware, firmware, and/or software (including computer-readable, preferably computer-executable instruction) to produce, transmit, receive and display electronic information. The computer-executable instructions can be transferable via computer-readable medium such as computer memory, floppy disks, conventional hard disks, CD-ROMS, Flash ROMS, nonvolatile ROM, and RAM. Computer-readable medium also can include information transferred via a communication port (e.g., downloads from the internet) and the computer-executable instructions include, but are not limited to, hardware description languages (e.g., Verilog) and graphic data systems (e.g., GDS data) which can be used to design, test and manufacture integrated circuits.

The information signal source 12 can be configured as an input to the OFDM transmitter 14. The information signal source 12 can be configured to provide an information signal 13, for example, digital and analog signals such as WiFi (e.g., Ethernet packets) and video broadcasts (e.g., TDMB, DVB, DVB-H). The OFDM transmitter 14 can be configured to transform and propagate information from the signal source 12 through the transmission antenna 16. For example, the OFDM transmitter 14 can be configured to transmit DVB-H video signals through a propagation medium such as the atmosphere. The transmission antenna 16 can be configured to transmit through other propagation mediums such as coaxial cable connections, or a fiber-optic network. The OFDM transmitter 14 and the transmission antenna 16 can be integrated in a single device, or each can exist as discrete components with an operable connection between one another.

The information display device 22 can include a receiving antenna 18 and an OFDM receiver 20. Here, as an example only and not as a limitation, the receiving antenna 18 and the OFDM receiver 20 can be integrated with the information display device 22. The receiving antenna 18 can be configured to receive the signal transmitted from the transmitting antenna 16 (e.g., via terrestrial and satellite broadcasts, cable and fiber-optic transmissions), and can be operably connected to the OFDM receiver 20. As will be discussed below, the OFDM receiver 20 can be configured to output a signal of interest $x(t)$ to a monitor 24. The signal of interest $x(t)$ is substantially similar to the information signal 13. For example, the information signal 13 can be a DVB-H video signal. The information display device 22 can also be capable of outputting audio signals. For example, the information display device 22 can be a portable music player and the information signal 12 can be a satellite broadcast or an encoded audio file (e.g., MP3 or .wav audio formats).

Figure 2:
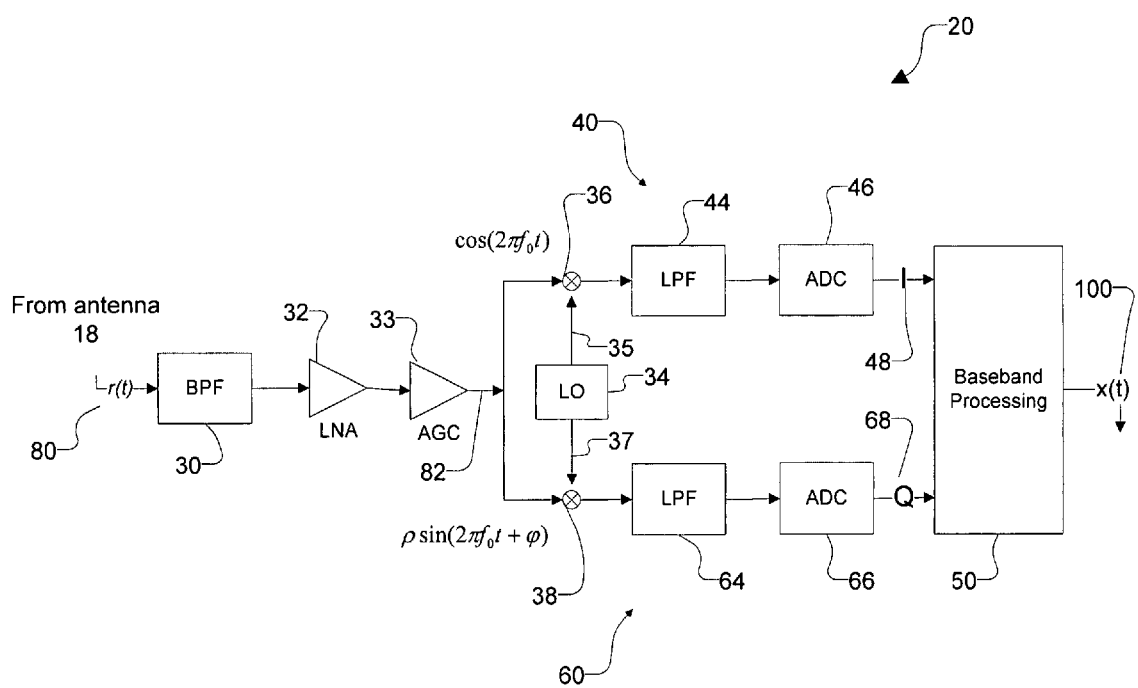
FIG. 2 is a block diagram of a ZIF OFDM receiver.

Referring to FIG. 2, with further reference to FIG. 1, the OFDM receiver 20 can include a band-pass filter 30, a low noise amplifier (LNA) 32, an AGC amplifier 33, a local oscillator 34, and signal multipliers 36, 38. The local oscillator 34 can be configured to provide a complex waveform to generate an In-phase (I) branch signal 35 at the signal multiplier 36, and a Quadrature-phase (Q) branch signal 37 at the signal multiplier 38. The I phase branch 40 can include a low pass filter 44, and an analog to digital converter 46. The Q phase branch 60 can include a low pass filter 64, and an analog to digital converter 66. A baseband processing unit 50 can be connected and configured to receive digitized I and Q branch signals 48, 68 and can be configured to store and process the I and Q signals 48, 68 to output a signal of interest $x(t)$ 100, which is substantially similar to the information signal 13.

The OFDM receiver 20 can be a Zero Intermediate Frequency (ZIF) direct-conversion OFDM receiver, and can be configured to receive an RF signal $r(t)$ 80 through the receiving antenna 18. The band-pass filter 30, the LNA 32, and the AGC amplifier 33 can be configured to process the RF signal $r(t)$ 80 to frequency filter and amplify the signal 80 to output a modified $r(t)$ signal 82 defined as:

$$r(t)=x(t)e^{2\pi f_0 tj}+x^*(t)e^{-2\pi f_0 tj} \quad (1)$$

where $x(t)$ represents the signal of interest (i.e., the information signal 13), and $f_0$ denotes the RF carrier frequency provided by the OFDM transmitter 14. The ZIF direct-conversion OFDM receiver 20 can down-convert $r(t)$ to a baseband signal using the local oscillator 34. In one embodiment, as an example only and not a limitation, the performance characteristics of the combination of the LNA 32, the AGC 33, the local oscillator 34, multipliers 36, 38, and LPF 44, 64 can be similar to commercially available tuner modules such as the Freescale NC44CD02 tuner. The local oscillator 34 can introduce an imbalance into the I and Q branches 40, 60. In general, the imbalance is a result of variations in analog circuit performance due to circuit design and device processing factors (i.e., circuit path lengths, oxide thickness, doping levels, gate lengths). The I/Q imbalance introduced by the local oscillator 34 can be defined in the time domain as:

$$z(t) = \cos(2\pi f_0 t) - j\rho \sin(2\pi f_0 t + \phi) \quad (2)$$

where $\rho$ is the amplitude imbalance factor and $\phi$ represents the phase imbalance.

With mathematical substitution and the application of Euler's formula, the local oscillator signal z(t) in equation (2) can be modified to:

$$z(t) = \alpha e^{-2\pi f_0 t j} + \beta e^{2\pi f_0 t j} \quad (3)$$

where the imbalance parameters are:

$$\alpha = \frac{1}{2}(1 + \rho e^{-j\varphi}) \quad (4)$$

and, $$\beta = \frac{1}{2}(1 - \rho e^{j\varphi}) \quad (5)$$

Under theses parameters, the values $\rho=1$ and $\phi=0$ indicate that the I and Q branches 40, 60 are perfectly matched.

An estimate of the signal of interest x(t) 100 (i.e., $\tilde{x}(t)$) can be defined by:

$$\tilde{x}(t) = LP\{z(t)r(t)\} \quad (6)$$

where $LP\{z(t)r(t)\}$ represents the combination of the received signal r(t) and the local oscillator signal z(t) after being processed by the low pass filters 44, 64.

Further, it can be shown that:

$$\tilde{x}(t) = \alpha x(t) + \beta x^*(t) \quad (7)$$

Through derivation, the following formula can be used to recover the signal of interest x(t).

$$x(t) = \frac{\alpha^*}{|\alpha|^2 - |\beta|^2}\tilde{x}(t) - \frac{\beta}{|\alpha|^2 - |\beta|^2}\tilde{x}^*(t) \quad (8)$$

The baseband processing unit 50 can include digital memory and at least one processor configured to store and execute instructions received from a computer-readable medium. For example, the baseband processing unit 50 can perform a Fast Fourier Transform (FFT) on the digitized I and Q branch signals 48, 68. The result of the FFT in the baseband processing unit 50 can be described as:

$$\tilde{X}_m(n) = \alpha X_m(n) + \beta X^*_{-m}(n) \quad (9)$$

where $\tilde{X}_m(n)$ denotes the m-th sample in the frequency domain (or spectral representation) of the n-th symbol, and $\tilde{X}_{-m}(n)$ is the mirrored sample of $\tilde{X}_m(n)$ around the direct current component of the received signal r(t).

Similar to equation (8), the value of X can be described in the frequency domain as:

$$X_m(n) = \frac{\alpha^*}{|\alpha|^2 - |\beta|^2}\tilde{X}_m(n) - \frac{\beta}{|\alpha|^2 - |\beta|^2}\tilde{X}^*_{-m}(n) \quad (10)$$

Estimates for $\rho$ and $\phi$ can be used in equations (4) and (5) to calculate $\alpha$ and $\beta$. The values of $\alpha$ and $\beta$ can be used with equations (8) and (10) to recover the signal of interest x(t) 100.

The estimated values for $\rho$ and $\phi$ in the I/Q imbalance algorithm can be derived through the following equations. Assuming that $E\{X_m X_{-m}\} \cong 0$, then:

$$E\{\tilde{X}_m \tilde{X}_{-m}\} = E\{(\alpha X_m + \beta X^*_{-m})(\alpha X_{-m} + \beta X^*_m)\} = E\{\alpha\beta |X_m|^2 + \alpha\beta |X_{-m}|^2\} \quad (11)$$

Similarly, the following simplification yields:

$$E\{|\tilde{X}_m + \tilde{X}^*_{-m}|^2\} = E\{|\alpha X_m + \beta X^*_{-m} + \alpha^* X^*_{-m} + \beta^* X_m|^2\}$$

$$= E\{|(\alpha + \beta^*)X_m + (\alpha^* + \beta)X^*_{-m}|^2\} \quad (12)$$

$$= E\{|X_m + X^*_{-m}|^2\} \quad (13)$$

$$= E\{|X_m|^2 + |X^*_{-m}|^2\} \quad (14)$$

where, $\alpha + \beta^* = 1$, which can be derived from equations (4) and (5). Combining equations (11) and (14) yields:

$$\frac{E\{\tilde{X}_m \tilde{X}_{-m}\}}{E\{|\tilde{X}_m + \tilde{X}^*_{-m}|^2\}} = \alpha\beta \quad (15)$$

Substituting equations (4) and (5) into equation (15) produces:

$$\frac{1}{4}(1 - \rho^2) - \frac{j}{2}\rho\sin\varphi = \frac{E\{\tilde{X}_m \tilde{X}_{-m}\}}{E\{|\tilde{X}_m + \tilde{X}^*_{-m}|^2\}} \quad (16)$$

Since $\rho$, $\sin\phi$ and $|X_m + X^*_{-m}|^2$ are all real values, then:

$$\tilde{\rho} = \sqrt{\frac{E\{|\tilde{X}_m + \tilde{X}^*_{-m}|^2\} - 4\text{Re}\{E\{\tilde{X}_m - \tilde{X}^*_{-m}\}\}}{E\{|\tilde{X}_m + \tilde{X}^*_{-m}|^2\}}}$$

$$= \sqrt{\frac{E\{|\tilde{X}_m - \tilde{X}^*_{-m}|^2\}}{E\{|\tilde{X}_m + \tilde{X}^*_{-m}|^2\}}} \quad (17)$$

where $\Re e\{\cdot\}$ denotes the real value component of a complex number.

Similarly, an estimate of $\phi$ can be derived through the following:

$$\sin\tilde{\varphi} = -\frac{2}{\tilde{\rho}}\Im m\left\{\frac{E\{\tilde{X}_m \tilde{X}^*_{-m}\}}{E\{|\tilde{X}_m + \tilde{X}^*_{-m}|^2\}}\right\} \quad (18)$$

where $\Im m\{\cdot\}$ denotes the imaginary value component of a complex number. It follows that:

$$\tilde{\varphi} = \arcsin\left\{-\frac{1+\tilde{\rho}}{\tilde{\rho}}\Im m\left\{\frac{E\{\tilde{X}_m \tilde{X}^*_{-m}\}}{E\{|\tilde{X}_m|^2 + |\tilde{X}^*_{-m}|^2\}}\right\}\right\} \quad (19)$$

Thus, estimates for ρ and φ can be calculated from equations (17) and (19) and used to calculate α and β in equations (4) and (5), which can be used to recover the signal of interest x(t) 100 in equation (8).

Figure 3:
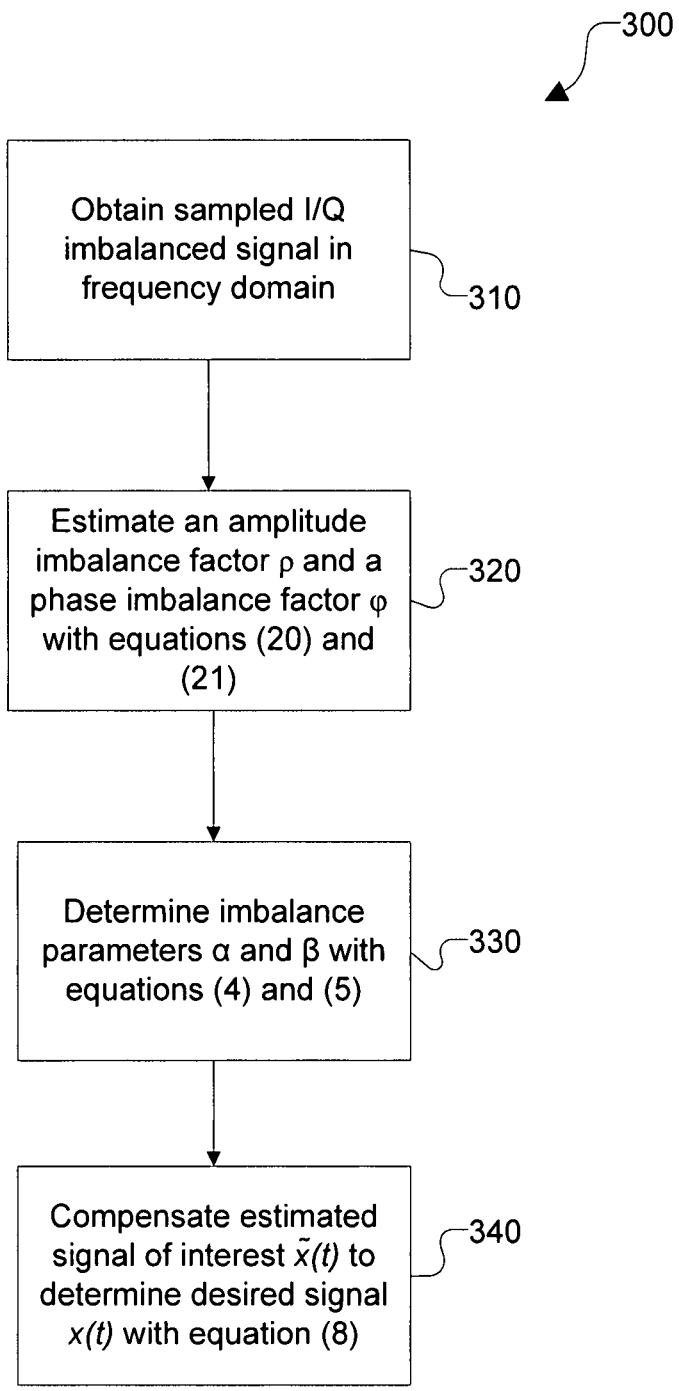
FIG. 3 is a flow chart of a process to calculate an amplitude imbalance factor and a phase imbalance factor.

Referring to FIG. 3, with further reference to FIG. 2, a process 300 for determining the imbalance between the I and Q branches 40, 60 in baseband processing unit 50 can include the stages shown. The process 300, however, is exemplary only and not limiting. The process 300 can be altered, e.g., by having stages added, removed, or rearranged.

At stage 310, the baseband processing unit 50 receives the digitized I and Q branch signals 48, 68, performs a Fast Fourier Transformation, and stores the results. For example, the data representing the frequency domain signal described in equation (9) can be accessed from a known location in memory.

At stage 320, the baseband processing unit 50 calculates a time expectation (i.e., time averaging) of the digitized I and Q branch signals 48, 68 in the frequency domain to estimate an amplitude imbalance factor $\bar{\rho}$ and a phase imbalance factor $\bar{\phi}$ by using the following relationships, which are derived from the ensemble expectation of equations (17) and (19):

$$\bar{\rho} = \sqrt{\frac{\sum_{n,m}\{|\tilde{X}_m(n) - \tilde{X}^*_{-m}(n)|^2\}}{\sum_{n,m}\{|\tilde{X}_m(n) + \tilde{X}^*_{-m}(n)|^2\}}} \quad (20)$$

The baseband processing unit 50 can perform computational actions associated with equation 20. For example, the baseband processing unit 50 can calculate the absolute value of a complex number. The baseband processing unit 50 can do this using two multiplication actions and one addition action. The baseband processing unit 50 can also calculate the sum of two complex numbers using two summation actions. The baseband processing unit 50 can also be configured to performs division actions (e.g., using a low-complexity approximation algorithm). The baseband processing unit 50 can also use a look-up-table to determine the solution to the square root operation in equation 20. Thus to calculate the value of $\bar{\rho}$ as indicated in equation 20 over a total of N sub-carriers, the baseband processing unit 50 performs 8N-2 summations, 4N multiplications, one division, and one look-up-table operation. These computational actions are exemplary and not limiting as other numerical analysis and computational actions can be used to achieve substantially similar results.

An estimate of an amplitude imbalance factor $\bar{\phi}$ can also be derived through a time expectation (i.e., time averaging), thus can be determined by:

$$\bar{\varphi} = \arcsin\left\{-\frac{1+\bar{\rho}}{\bar{\rho}}\mathcal{J}m\left\{\frac{\sum_{n,m}\{\tilde{X}_m(n)\tilde{X}_{-m}(n)\}}{2\sum_{n,m}|\tilde{X}_m(n)|^2}\right\}\right\} \quad (21)$$

where, equation (21) incorporates the fact that $$\sum_{n,m}|\tilde{X}_m(n)|^2 = \sum_{n,m}|\tilde{X}_{-m}(n)|^2.$$

The baseband processing unit 50 can determine the imaginary value of the multiplication of two complex numbers, which can be calculated by subtracting $2|\tilde{X}_m(n)|^2$ from $|\tilde{X}_m(n) - \tilde{X}^*_{-m}(n)|^2$. This calculation requires only one addition action. The baseband processing unit 50 can also perform division actions (e.g., using a low-complexity approximation algorithm) and can determine the arcsine of a value via a look-up-table. Thus, to calculate the value of $\bar{\phi}$ as indicated in equation (21) over a total of N sub-carriers, the baseband processing unit 50 can perform 4N summations, 2N+2 multiplications, two division, and one look-up-table operation. These computational actions are exemplary and not limiting as other numerical analysis and computational actions can be used to achieve substantially similar results.

In general, the summation of approximately 1000 sub-carriers in equations (20) and (21) can provide a sufficient estimation of the imbalance factors $\bar{\rho}$ and $\bar{\phi}$, although practicable results may also be obtained with a fewer number of sub-carriers.

At stage 330, the baseband processing unit determines the imbalance parameters α and β with equations (4) and (5).

At stage 340, the baseband processing unit 50 uses the imbalance parameters α and β to compensate for the I/Q imbalance in the estimated signal $\tilde{x}(t)$. The baseband processing unit 50 uses equation (8) to determine the signal of interest x(t) from the imbalance parameters α and β.

Figure 4:
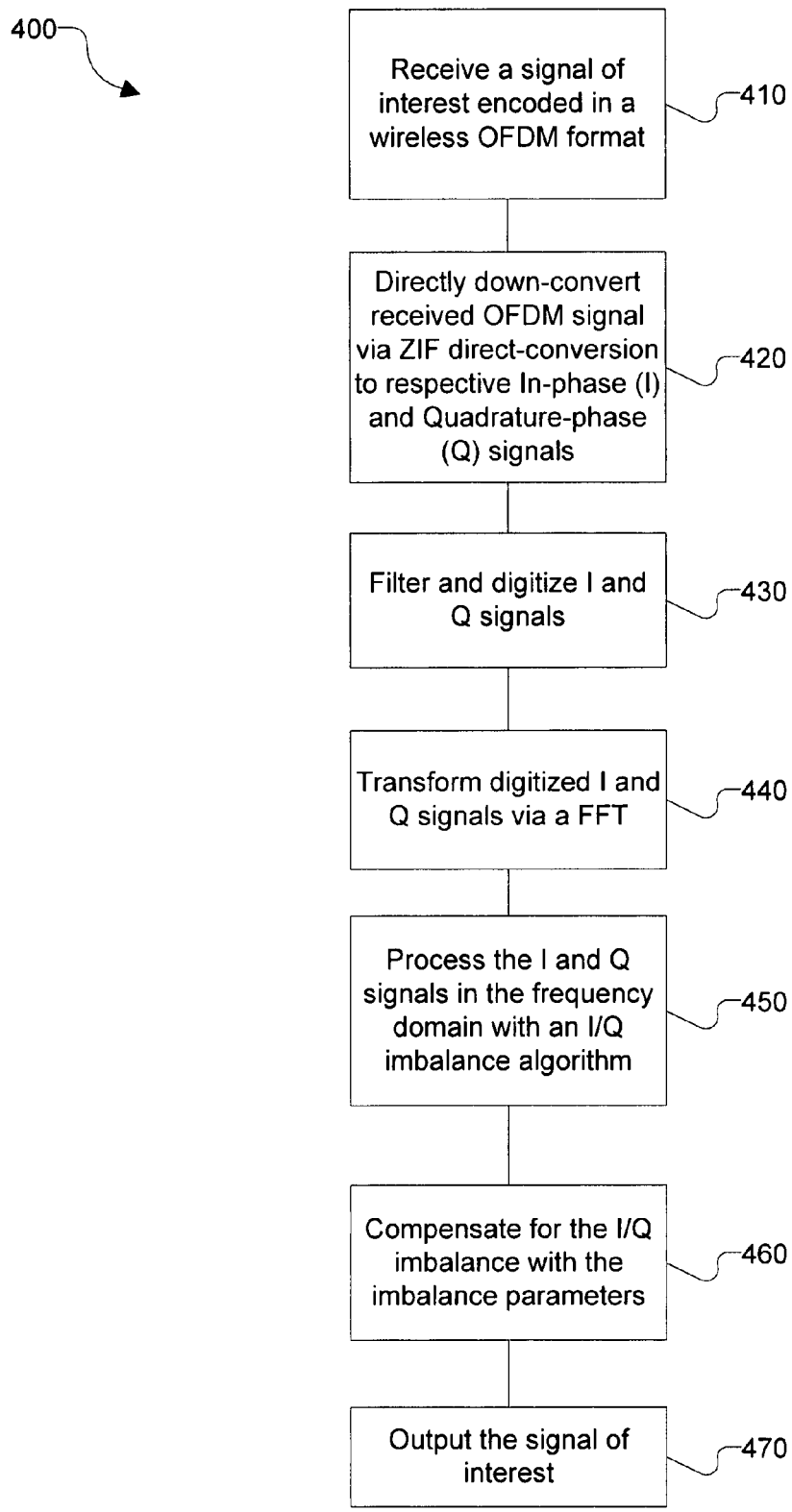
FIG. 4 is a flowchart of a process for outputting a signal of interest from a received OFDM signal.

Referring to FIG. 4, with further reference to FIG. 1-3, a process 400 for outputting a signal of interest from a received OFDM signal can include the stages shown. The process 400, however, is exemplary only and not limiting. The process 400 can be altered, e.g., by having stages added, removed, or rearranged.

At stage 410, the information display device 22 can receive a signal of interest encoded in an OFDM format.

At stage 420, the OFDM receiver 20 can amplify and multiply the received signal r(t) with a complex wave form generated from the local oscillator 34. The resulting signal can include an In-phase component (I) and a Quadrature-phase component (Q).

At stage 430, the OFDM receiver 20 filters and digitizes the I and Q signals 40, 60 generated in stage 420. The I and Q signals 40, 60 are filtered to remove signal noise that may exist at higher frequencies. For example, the low pass filters 44, 64 can be tuned in accordance with established signal standards (e.g., 10 MHz for the 802.11 standard). The OFDM receiver 18 can also convert the I and Q branch signals 40, 60 from an analog to a digital form. For example, the analog to digital converters 46, 66 operate at 20 Mhz with 12 bit precision.

At stage 440, the OFDM receiver 20 can transform the digitized I and Q signals 48, 68 from the time domain to the frequency domain via a Fast Fourier Transform (FFT). For example, the baseband processing unit 50 can include a digital signal processor, and associated memory devices, configured to execute a FFT algorithm (e.g., Cooley-Tukey, Bruun's, Rader's, Bluestein's).

At stage 450, the baseband processing unit 50 can process the results of stage 440 (e.g., data representing the frequency domain of the I and Q signal branches) and executes the process 300 for determining the imbalance between the I and Q branches 40, 60, as indicated in stages 320 and 330. For example, the results of the FFT algorithm over N sub-carriers persists in cache memory. The baseband processing unit 50 can then estimate the imbalance factors ρ and φ, and determine the imbalance parameters α and β.

At stage 460, the baseband processing unit 50 can compensate for the I/Q imbalance in the estimated signal of interest $\tilde{x}(t)$, and determine the signal of interest x(t) in the time domain indicated in stage 340.

At stage 470, OFDM receiver 20 can output the signal of interest x(t) to the monitor 24. In general, the output can be a digital signal in the time domain, however, the OFDM receiver 20 can also be configured to provide analog signal outputs as well. For example, the output generated at stage 470 can be digital video signal that is compatible with a LCD video display 24 integrated within the information display device 22.

In operation, the I/Q imbalance compensation algorithm provides more than expected improvements in Bit Error Rate (BER) performance for OFDM broadcast systems. For example, Tables 1-4 represent the performance of the I/Q imbalance compensation algorithm based on DVB systems. Each table represents a typical performance envelope for a DVB system including the Channel Type and Signal Characteristics. The results within each table indicate the BER performance improvements between receivers with and without an I/Q imbalance compensation algorithm. These results are exemplary and not limiting as other OFDM based systems and their associated signals can also benefit from the I/Q imbalance compensation algorithm.

TABLE 1

Gaussian Channel; 13 dB; $\rho = 1.5$, $\phi = 10°$;
16 QAM, no hierarchy, rate 2/3, 1/16 Guard interval, 2K mode

|  | BER after Viterbi | Estimated Rho | Estimated Phi |
| --- | --- | --- | --- |
| Imbalance, but no correction | 1.6491e−003 | | |
| Imbalance correction | 1.0745e−006 | 1.514 | 9.85° |

TABLE 2

Gaussian Channel; 13 dB; $\rho = 1.3$, $\phi = 15°$;
16 QAM, no hierarchy, rate 2/3, 1/16 Guard interval, 2K mode

|  | BER after Viterbi | Estimated Pho | Estimated Phi |
| --- | --- | --- | --- |
| no imbalance correctionn | 2.6186e−002 | | |
| Imbalance correction | 3.7226e−006 | 1.312 | 15.2° |

TABLE 3

Gaussian Channel; 13 dB; $\rho = 1.4$, $\phi = 30°$;
16 QAM, no hierarchy, rate 2/3, 1/16 Guard interval, 2K mode

|  | BER after Viterbi | Estimated Pho | Estimated Phi |
| --- | --- | --- | --- |
| no imbalance correctionn | 3.8107e−001 | | |
| Imbalance correction | 1.6752e−005 | 1.383 | 29.61° |

TABLE 4

Fading Channel; 20.6 dB; 5 Hz Doppler; $\rho = 1.2$, $\phi = 10°$;
64 QAM, no hierarchy, rate 2/3, 1/16 Guard interval, 2K mode

|  | BER after Viterbi | Estimated Pho | Estimated Phi |
| --- | --- | --- | --- |
| No imbalance correction | 1.2154e−003 | | |
| Imbalance correction | 2.7919e−006 | 1.1906 | 9.27° |

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A receiver comprising:
    a local oscillator (LO) configured to generate a first LO signal and a second LO signal;
    a first signal multiplier configured to receive a processed signal and the first LO signal, and output an in-phase branch signal, the processed signal including an information signal;
    a second signal multiplier configured to receive the processed signal and the second LO signal, and output a quadrature-phase branch signal; and
    a baseband processing unit configured to:
        receive a digitized in-phase branch signal associated with the signal output by the first signal multiplier;
        receive a digitized quadrature-phase branch signal associated with the signal output by the second signal multiplier;
        calculate a time expectation of the digitized in-phase and quadrature-phase branch signals in a frequency domain to estimate values of an amplitude imbalance factor $\tilde{\rho}$ and a phase imbalance factor $\tilde{\phi}$ over a total of N sub-carriers by performing, for each of the amplitude and phase imbalance factors, at least one look-up-table operation and one or more of: a plurality of summation actions, a plurality of multiplication actions, or a plurality of division actions; wherein N is an integer and greater than one
        apply an amplitude imbalance parameter and a phase imbalance parameter derived from the amplitude imbalance factor $\tilde{\rho}$ and the phase imbalance factor $\tilde{\phi}$ to the in-phase and quadrature-phase branch signals to recover the information signal from the processed signal; and
        output the information signal.

2. The receiver of claim 1 wherein the baseband processing unit comprises a memory, the baseband processing unit further configured to:
    perform a fast Fourier transform (FFT) on the digitized in-phase and quadrature-phase branch signals to obtain results; and
    store the results in the memory.

3. The receiver of claim 1 wherein the baseband processing unit comprises at least one processor configured to store and execute instructions received from a computer-readable memory.

4. The receiver of claim 1 wherein the receiver is an orthogonal frequency division multiplexing (OFDM) receiver.

5. The receiver of claim 1 wherein the receiver is a zero intermediate frequency (ZIF) receiver.

6. The receiver of claim 1 further comprising:
    a first low pass filter configured to filter the in-phase branch signal, and output a filtered in-phase branch signal;
    a first analog to digital converter configured to digitize the filtered in-phase branch signal, and output the digitized in-phase branch signal;
    a second low pass filter configured to filter the quadrature-phase branch signal, and output a filtered quadrature-phase branch signal; and a second analog to digital converter configured to digitize the filtered quadrature-phase branch signal, and output the digitized quadrature-phase branch signal.

7. The receiver of claim 6 further comprising:
an antenna configured to receive a signal;
a band-pass filter configured to filter the signal; and
at least one amplifier configured to amplify the filtered signal and generate the processed signal.

8. The receiver of claim 1 wherein the information signal is at least one of a digital signal, an analog signal, or a video signal.

9. An information display device comprising a monitor and the receiver of claim 1, wherein the monitor receives the information signal from the baseband processing unit of the receiver.

10. A method of recovering an information signal from a received signal, the method comprising:
receiving and processing a signal including an information signal to generate a processed signal;
generating an in-phase branch signal based on a processed signal and a first LO signal;
generating a quadrature-phase branch signal based on the processed signal and a second LO signal;
digitizing the in-phase and quadrature-phase branch signals;
calculating a time expectation of the digitized in-phase and quadrature-phase branch signals in a frequency domain to estimate values of an amplitude imbalance factor $\tilde{\rho}$ and a phase imbalance factor $\tilde{\phi}$ over a total of N sub-carriers by performing, for each of the amplitude and phase imbalance factors, at least one look-up-table operation and one or more of: a plurality of summation actions, a plurality of multiplication actions, or a plurality of division actions; wherein N is an integer and greater than one
applying an amplitude imbalance parameter and a phase imbalance parameter derived from the amplitude imbalance factor $\tilde{\rho}$ and the phase imbalance factor $\tilde{\phi}$ to the in-phase and quadrature-phase branch signals to recover the information signal from the processed signal; and
outputting the information signal.

11. The method of claim 10 further comprising:
performing a fast Fourier transform (FFT) on the digitized in-phase and quadrature-phase branch signals to obtain results; and
storing the results in a memory.

12. The method of claim 10 further comprising:
filtering the in-phase branch signal and the quadrature-phase branch signal; and
digitizing the filtered in-phase branch signal and the filtered quadrature-phase branch signal.

13. The method of claim 10 further comprising:
filtering and amplifying the received signal to generate the processed signal.

14. The method of claim 10 wherein the information signal is at least one of a digital signal, an analog signal, or a video signal.

15. A non-transitory computer-readable storage medium storing a set of instructions for execution by one or more processors to facilitate manufacture of a semiconductor device that includes:
a local oscillator (LO) configured to generate a first LO signal and a second LO signal;
a first signal multiplier configured to receive a processed signal and the first LO signal, and output an in-phase branch signal, the processed signal including an information signal;
a second signal multiplier configured to receive the processed signal and the second LO signal, and output a quadrature-phase branch signal; and
a baseband processing unit configured to:
receive a digitized in-phase branch signal associated with the signal output by the first signal multiplier;
receive a digitized quadrature-phase branch signal associated with the signal output by the second signal multiplier;
calculate a time expectation of the digitized in-phase and quadrature-phase branch signals in a frequency domain to estimate values of an amplitude imbalance factor $\tilde{\rho}$ and a phase imbalance factor $\tilde{\phi}$ over a total of N sub-carriers by performing, for each of the amplitude and phase imbalance factors, at least one look-up-table operation and one or more of: a plurality of summation actions, a plurality of multiplication actions, or a plurality of division actions; wherein N is an integer and greater than one
apply an amplitude imbalance parameter and a phase imbalance parameter derived from the amplitude imbalance factor $\tilde{\rho}$ and the phase imbalance factor $\tilde{\phi}$ to the in-phase and quadrature-phase branch signals to recover the information signal from the processed signal; and
output the information signal.

16. The non-transitory computer-readable storage medium of claim 15 wherein the instructions are Verilog data instructions.

17. The non-transitory computer-readable storage medium of claim 15 wherein the instructions are hardware description language (HDL) instructions.

* * * * *